United States Patent

Rivolta et al.

[11] Patent Number: 5,168,974
[45] Date of Patent: Dec. 8, 1992

[54] CLUTCH MECHANISM, IN PARTICULAR FOR A MOTOR VEHICLE

[75] Inventors: Guido Rivolta, Vigevano, Italy; Raymond Hagnere, Amiens, France

[73] Assignee: Valeo, Paris, France

[21] Appl. No.: 771,214

[22] Filed: Oct. 4, 1991

[30] Foreign Application Priority Data

Oct. 5, 1990 [FR] France ................... 90 12285

[51] Int. Cl.⁵ .................................... F16D 13/58
[52] U.S. Cl. ........................ 192/89 B; 192/70.27
[58] Field of Search ............. 192/89 B, 70.27, 70.28, 192/70.29

[56] References Cited

U.S. PATENT DOCUMENTS

| | | | |
|---|---|---|---|
| 4,114,740 | 9/1978 | Sugiura et al. | 192/89 B X |
| 4,602,708 | 7/1986 | Nagano | 192/89 B X |
| 4,641,736 | 2/1987 | Förster | 192/89 B |
| 4,690,259 | 9/1987 | Naudin | 192/89 B X |
| 4,751,991 | 6/1988 | Naudin | 192/89 B |
| 4,844,226 | 7/1989 | Taketani | 192/89 B X |
| 4,949,829 | 8/1990 | Tojima et al. | 192/89 B |
| 4,967,891 | 11/1990 | Takeuchi | 192/89 B X |

FOREIGN PATENT DOCUMENTS

| | | |
|---|---|---|
| 3433644 | 3/1986 | Fed. Rep. of Germany .... 192/89 B |
| 853070 | 3/1940 | France . |
| 2011017 | 7/1979 | United Kingdom . |
| 2098287 | 11/1982 | United Kingdom . |
| 2120329 | 11/1983 | United Kingdom . |
| 2207965 | 2/1989 | United Kingdom . |
| 9001642 | 2/1990 | World Int. Prop. O. ........ 192/89 B |

Primary Examiner—Leslie A. Braun
Assistant Examiner—Nicholas Whitelaw
Attorney, Agent, or Firm—Longacre & White

[57] ABSTRACT

A clutch mechanism comprising a cover plate having a base portion joined to a skirt portion, a pressure plate and a diaphragm. The cover plate has a first shoulder which extends toward the base portion, while the pressure plate has, at its outer periphery, a second shoulder extending away from the base portion. The second shoulder is axially closer to the base portion than the first shoulder. A resilient compensating element is fitted between and in engagement with the first and second shoulders, and biases the pressure plate towards the base portion of the cover plate in such a way as to oppose the increase in the force of the diaphragm that may arise in operation.

9 Claims, 1 Drawing Sheet

CLUTCH MECHANISM, IN PARTICULAR FOR A MOTOR VEHICLE

FIELD OF THE INVENTION

This invention relates to clutch mechanisms, in particular for motor vehicles.

BACKGROUND OF THE INVENTION

Such a mechanism is for example described in the specification of published United Kingdom patent application no. GB 2 120 329A, and includes at least one pressure plate, a cover plate, and a diaphragm which is arranged between the cover plate and the pressure plate. The diaphragm bears on the cover plate and on the pressure plate, which is mounted for axial movement with respect to the cover plate, and which is coupled for rotation with respect to the cover plate. The cover plate has a skirt portion and a base portion. The diaphragm biasses the pressure plate towards a reaction plate of the clutch, so as to grip friction liners or pads, carried by a clutch plate of the clutch, between the pressure and reaction plates.

A given clutch mechanism may be used to equip different engines. In that case, only the diaphragm need be a change part, with for example its thickness and/or its inclination being modified as required, in the manner described in the specification of published United Kingdom patent application No. GB 2 011 017A, in order to modify the gripping force of the diaphragm, and to adapt to the torque which is reqired to be transmitted by the engine. In a modification, even the diaphragm is not a change part, being selected so as to carry the highest torque to be transmitted, with the use, where required, of a suitable device to assist the operation, according to the vehicle in which the mechanism is to be installed.

In all case, having regard to the characteristic curve of the diaphragm (which is generally sinusoidal in shape), it can be necessary to use a resilient compensating means. Such a compensating means is described in the above mentioned specification GB No. 2 120 329A, and its purpose is to flatten the characteristic curve of the diaphragm in its working zone, and in particular to reduce the forces required to be exerted by the driver in order to disengage the clutch.

With the arrangements described in GB No. 2 120 329A, there is a problem in that the mechanism has to be pre-equipped with the resilient compensating means, so that it is necessary to differentiate in advance between those mechanisms which must be equipped with such compensating means, and those which need not.

DISCUSSION OF THE INVENTION

An object of the present invention is to overcome this drawback, and so to provide a novel clutch mechanism which after assembly can be equipped at will with a resilient compensating means.

In accordance with the invention, a clutch mechanism, in particular for a motor vehicle, comprising a cover plate adapted to be fixed to a reaction plate, at least one pressure plate, mounted for translational movement with respect to the cover plate and being coupled to the latter for rotation therewith, and a diaphragm which bears on the cover plate so as to exert a biassing force on the pressure plate, wherein the cover plate has a base portion for engagement of the diaphragm thereon, with the said base portion being joined to a skirt portion which at least partially surrounds the said pressure plate, while the pressure plate includes an outer face, on its side furthest from the base portion of the cover plate, is characterised in that the cover plate has a first shoulder directed towards the base portion of the said cover plate, while the pressure plate has at its outer periphery a second shoulder which is directed away from the base portion of the cover plate, and which is axially closer to the said base portion than the first shoulder, and in that the first shoulder and the second shoulder are adapted for there to be fitted between them a resilient compensating means which opposes the increase in load of the diaphragm and which bears on the first shoulder and the second shoulder so as to bias the pressure plate towards the base portion of the cover plate.

The invention enables the resilient compensating means to be fitted after the mechanism has been assembled, by introducing the compensating means (which preferably consists of a resilient ring) from the side of the outer face of the pressure plate which is directed away from the base portion of the cover plate. The fitting force is not very large, because in the storage condition, the force exerted by the diaphragm on the pressure plate is small.

It is even possible to test the mechanism and then to select the force exerted by the resilient compensating means accordingly.

This arrangement is also beneficial in connection with the fitting of replacement parts. It enables the service engineer to stock only a single type of clutch mechansim, and then to adapt it, according to the vehicle concerned, by fitting an appropriate resilient compensating means if required. It is even possible eventually to fit the compensating means to the vehicle, for example when the clutch is removed, even if the vehicle did not originally have these compensating means.

The first shoulder may be carried by the skirt portion of the cover plate, so as to project radially inwardly of the latter, while the second shoulder may be formed in a slot which is formed at the inner periphery of the pressure plate. With this arrangement the resilient compensating means can consist of a simple Belleville ring, fitted by simple snap-fitting of the latter. This ring is fully protected after being fitted.

The invention is illustrated in the description of a preferred embodiment which follows, given by way of example and with reference to the accompanying drawing.

BRIEF DESCRIPTION OF THE DRAWING

The single FIGURE of the drawing shows a mechanism in accordance with the invention, in axial cross section, the mechanism being equipped with a compensating spring.

DESCRIPTION OF A PREFERRED EMBODIMENT OF THE INVENTION

Figure 1:
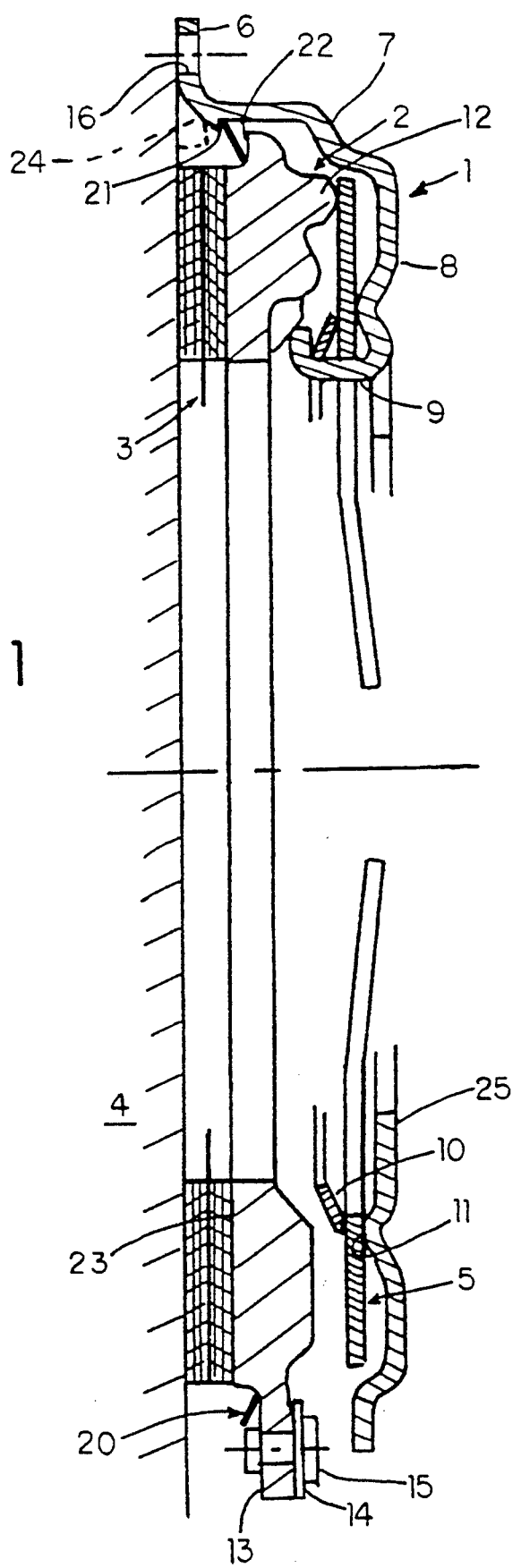

The FIGURE shows a clutch mechanism constituting a unitary assembly for a motor vehicle clutch. The mechanism comprises an assembly of annular members, namely, in this case, a cover plate 1, a pressure plate 2 and a diaphragm 5. The cover plate 1 is in the form of a hollow plate and has a securing flange 6, which is connected by means of an axially oriented skirt portion 7 to a base portion 8 which has a central opening.

The cover plate 1 is, in this example, a sheet metal pressing, and is adapted through its securing flange 6, which here projects radially outwardly away from the axis of the assembly, to be secured by means of suitable fasteners (not shown) to the reaction plate 4 of the clutch. The reaction plate 4 is fastened to the output shaft (i.e. the crankshaft) of the internal combustion engine of the motor vehicle. The said fasteners commonly consist of screws, bolts or studs extending through holes 6 which are formed for this purpose in the flange 6. In a modification, threaded fasteners may be replaced by rivets. The securing flange 6 is divided in known manner into a number of fastening portions, due to the presence of a plurality of lugs 13 which form part of the pressure plate 2 and which will be described below.

As in the specification of U.S. Pat. No. 4,690,259, the pressure plate 2 is surrounded in this example entirely by the skirt portion 7, and is joined to the cover plate 1 for rotation with the latter, while being able to move axially, by virtue of a plurality of tongues 14. In a modification, a coupling of the tenon and mortice type may be provided between the cover plate 1 and the pressure plate 2. The tongues 14 extend generally tangentially, and are fixed at one of their ends to the cover plate 1 by means of portions which are axially offset towards the securing flange 6, to which they are fixed. At their other end, the tongues 14 are secured to the radial lugs 13 projecting from the pressure plate 2.

The skirt portion 7 is of course slotted between the lugs 13. In this example, there are three of the latter, spaced apart regularly at intervals of 120 degrees. In other applications, four or more lugs 13 may be provided.

The pressure plate 2 also has axial bosses 12 which are spaced apart over a common pitch circle of the assembly, so as to offer an abutment surface to the diaphragm 5, with this abutment surface facing towards the base portion 8 of the cover plate. The diaphragm 5 is frusto conical in its free state, and is mounted in a manner such that it can tilt on the cover plate 1 by virtue of a plurality of fingers 9, which extend axially through apertures formed in the diaphragm 5. One free end of the fingers 9 is bent radially outwardly away from the axis of the assembly so as to retain in position a dished crown ring in the manner described in the specification of U.S. Pat. No. 4,751,991. The crown seal 10 offers, at its outer periphery, a secondary abutment surface to the diaphragm 5, aligned with a primary abutment surface 11 which is formed by pressing in the base portion 8 of the cover plate. The ring 10 extends radially inwardly towards the axis of the assembly from its abutment with the diaphragm 5.

In a modification, the diaphragm 5 may be mounted so as to tilt between two bearing rings carried by the lugs 9, or between a pressed out element of the base portion 8 and the head of a projecting pin extending through the diaphragm 5 and secured to the base portion 8 by crimping. Any other method of fastening is also possible, and in particular those described in the specification of published United Kingdom patent application no. GB 2 120 329A. In the latter, the diaphragm 5 has a peripheral portion which constitutes a Belleville ring, and a central portion which is divided into radial fingers by slots which constitute orifices, the latter being widened to allow the lugs 9 to pass through at the level of the inner periphery of the Belleville ring part of the diaphragm.

The diaphragm bears on the bosses 12 through the outer periphery of its Belleville ring portion, while it also bears on the primary abutment surface 11 (and thus on the cover plate 1) through the inner periphery of the Belleville ring portion, so as to bias the pressure plate 2 towards the reaction plate 4 (and therefore away from the base portion 8). In this way, friction pads or liners, visible in the drawing and carried by a clutch plate 3 (only part of which is shown in the drawing) are gripped between the pressure plate 2 and reaction plate 4. To this end, the pressure plate 2 has a transversely orientated external face 23 for contact with the friction liners. The face 23 faces away from the diaphragm 5 and away from the base portion 8 of the cover plate 1.

Thus, when the clutch is engaged, torque is transmitted from the engine shaft to the clutch plate 3, the latter being secured to the input shaft of the gearbox for rotation with it.

In order to disengage the clutch, a clutch release bearing (not shown) is actuated so as to exert a thrust on the ends of the fingers of the diaphragm 5, so as to cause the latter to pivot about the abutment surfaces 10 and 11. This causes the force exerted by the diaphragm 5 on the pressure plate 2 to be withdrawn, thus enabling the friction pads on the clutch plate 3 to be released.

During the working life of the clutch, the friction pads become worn, this wear being caused in the manner described for example in the specification of United Kingdom published patent application no. GB 2 011 017A, which also explains how this wear arises. The effect is that in certain cases, it can be necessary to provide the mechanism with a resilient compensating means for compensating for the increase in load on the diaphragm by acting against this increase in load.

In the present example, the cover plate 1 carries a first shoulder 21 which is directed towards the base portion 8 of the cover plate 1. The pressure plate 2 has at its outer periphery a second shoulder 22, which faces away from the base portion 8 of the cover plate and which is axially closer to the base portion 8 than to the first shoulder 21. In addition, the first shoulder 21 and the second shoulder 22 are adapted for mounting a resilient compensating element 20, which acts in opposition to the increase on the load of the diaphragm, and which engages on both the first shoulder 21 and the second shoulder 22 so as to urge the pressure plate 2 towards the base portion 8.

In the drawing, the first shoulder 21 is formed on at least two projections carried by the skirt portion 7. These projections are preferably diametrically opposed to each other, and are formed directly on the inner periphery of the skirt portion 7, being directed radially inwardly. The shoulder 21 faces towards the base portion 8. In this example, there is only one of these projections, which is interrupted in line with the lugs 13 of the pressure plate 2. The projection is machined on the inner face of the skirt portion 7. Also in this example, the first shoulder 21 is arranged at the level of the radiused edge which joins the skirt portion 7 to the securing flange 6.

In a modification, the first shoulder 21 may be defined by the internal face (which is directed towards the base portion 8) of at least two lugs 24 which are formed by pressing, so that the lugs 24 extend the securing flange 6 and project inwardly of the cover plate. Preferably one lug 24 is associated with each part of the flange 6. The material of the lugs 24 is upset into the skirt portion 7 by pressing and bending, which is carried out away from the axis of the assembly. Still by pressing and bending of the skirt portion 7, it is possible to obtain lugs which project radially inwardly but which are offset axially towards the base portion 8, with respect to the securing flange 6. These lugs may be attached to the skirt portion 7 by welding.

The second shoulder 22 is offset axially from the shoulder 21, and is defined in a slot which is formed in the outer periphery of the pressure plate 2. This slot may be formed by machining, or preferably (and as shown) in casting the pressure plate 2. The slot that includes the shoulder 22 is open in the outer face 23 of the pressure plate 2 (i.e. the face furthest from the diaphragm 5 and base portion 8). This is the friction surface with which the friction pads carried by the clutch plate 3 cooperate. The shoulder 22 is directed away from the base portion 8. It can thus be seen that the two shoulders 21 and 22 are directed towards each other, with the shoulder 21 being the one which is spaced furthest away from the base portion 8, that is to say being in the vicinity of the surface 23.

It will also be noted that use is made of the increased thickness of the pressure plate at this point, this increased thickness extending radially beyond the friction pads carried by the clutch plate 3. In this example, the base of the slot 22 is rounded.

The resilient compensating means preferably consists of an axially acting resilient ring which is interposed axially between the shoulders 21 and 22. In this example it consists of a simple Belleville ring 20 of frusto conical form, selected to exert a force according to the force exerted by the diaphragm 5, so as to flatten out the characteristic curve of the latter over the working life of the clutch, in such a way that the driver of the vehicle cannot feel in the clutch pedal the increase in load on the diaphragm. This increases driver comfort.

As will be clear from the foregoing description and the drawing, it is possible to assemble the clutch mechanism, and then to fit the ring 20 (or not to fit it, according to requirements, since in some cases the increase in load on the diaphragm is in fact tolerable). The fitting operation is carried out by simple snap-fitting which causes the ring 20 to deform.

It will be noted that the clutch is shown in FIG. 1 in the position in which it is mounted on the reaction plate 4, and that in the storage position, the diaphragm 5 is allowed to be inclined in order to cooperate with a set of radial tongues 25, due to the fact that there is nothing to oppose the displacement of the pressure plate 2. The tongues 25 are arranged alternately with the lugs 9. In the operation of fitting the ring 20, the biassing action exerted by the diaphragm 5 on the pressure plate 2 is thus minimised. It will be appreciated that in the storage position, the ring 20 opposes any displacement of the pressure plate 2, for example by virtue of its inertia, and it thus protects the tongue 14 against stressing.

The relative positions of the shoulders 21 and 22 will of course depend on the configuration of the mechanism, and in particular on that of the reaction plate 4 and the thickness of the friction liners carried by the clutch plate 3.

The present invention is not limited to the embodiment just described and shown in the drawing. In particular it is possible to use as the resilient compensating means a diaphragm or a Belleville ring having axially acting resilient fingers, inclined with respect to the radial plane and located at its outer periphery.

The resilient compensating means, for example the ring 20 in the drawing, may be segmented. In that case, the slot formed in the pressure plate is divided into several recesses, each of which has two circumferential shoulders for preventing the sectors of the ring 20 from rotating.

The resilient compensating means may be in the form of a dihedral, and it can engage directly on to the friction face 23, which then constitutes the second "shoulder". Its fitting may be of the bayonet type, and the ring 20 may for example have slots, the width of which is adapted for this purpose to that of the lugs 24.

The ring 20 may have resilient lugs at its outer periphery, these being adapted after deformation to cooperate with the edge of a slot formed in the skirt portion 7, for example the edge of a ventilating slot closest to the securing flange 6. This edge then naturally forms the second shoulder, and may be constituted by the securing flange 6 itself.

Again, the compensating means may consist of a plurality of rings, mounted either in parallel or in series.

The clutch may be of the "pull" type, having a peripheral portion defining a Belleville ring and bearing at its outer periphery on an abutment carried by the cover plate, while at its inner periphery it bears on bosses formed in the pressure plate, so that the clutch then acts in a traction mode on the ends of the fingers of the diaphragm. In all cases, the diaphragm bears on the base portion of the cover plate, so as to bias the pressure plate away from the base portion.

The reaction plate, instead of being flat, may have a peripheral axial flange, with the skirt portion of the cover plate then being made smaller so that it no longer entirely surrounds the pressure plate.

Finally, the mechanism may include a plurality of pressure plates, with friction liners between them. In that case, the second shoulder is formed on the outermost pressure plate.

What is claimed is:

1. A clutch mechanism comprising: a reaction plate; a cover plate; means securing the cover plate to the reaction plate; at least one pressure plate; means mounting the pressure plate to the cover plate for relative rotation between the pressure plate and the cover plate; and a diaphragm bearing on the cover plate and pressure plate whereby to exert a biassing force on the pressure plate, the cover plate including a base portion for engagement of the diaphragm therewith and a skirt portion joined to the base portion and at least partially surrounding the pressure plate, and the pressure plate including an outer face on its side furthest from said base portion of the cover plate, wherein the cover plate further comprises a first shoulder directed towards the base portion of the cover plate, and the pressure plate has a second shoulder formed on its outer periphery and directed away from said base portion of the cover plate, the second shoulder being axially closer to the base portion than the first shoulder, the clutch mechanism further including a resilient compensating means bearing between said first and second shoulders, so as to bias the pressure plate towards the base portion of the cover plate whereby to oppose increases in loading of the diaphragm.

2. A mechanism according to claim 1, wherein said first and second shoulders are arranged at a level of the outer face of the pressure plate furthest from the base portion of the cover plate.

3. A mechanism according to claim 1, wherein the cover plate further comprises at least two projections directed radially inwardly of the cover plate, said first shoulder being formed on said projections.

4. A mechanism according to claim 3, wherein said projections are integral with an inner periphery of the skirt portion of the cover plate.

5. A mechanism according to claim 3, wherein said projections are in the form of lugs which are upset in the skirt portion by pressing and bending radially inwardly of the cover plate.

6. A mechanism according to claim 1, wherein the pressure plate has at least one slot formed at its outer periphery, said second shoulder being formed in said slot or slots.

7. A mechanism according to claim 6, wherein the or each slot is open at the level of the outer face of the pressure plate furthest from the base portion of the cover plate.

8. A mechanism according to claim 1, wherein said resilient compensating means comprises an axially acting resilient ring interposed between said first and second shoulders.

9. A mechanism according to claim 8, wherein said resilient ring is a simple Belleville ring.

* * * * *